United States Patent [19]

Davis et al.

[11] 4,059,672
[45] Nov. 22, 1977

[54] METHOD OF DIGESTING BAUXITE VIA THE BAYER PROCESS WITH THE ADDITION OF REDUCING AGENTS

[75] Inventors: Trevor Crombie Maitland Davis, Sidney, Canada; James Ernest Laurie, Mandeville, Jamaica

[73] Assignee: Revere Copper and Brass Incorporated, New York, N.Y.

[21] Appl. No.: 346,736

[22] Filed: Apr. 2, 1973

[51] Int. Cl.$^2$ .............................. C01F 7/06; C01F 7/08
[52] U.S. Cl. .............................. 423/121; 423/121; 423/131
[58] Field of Search ............... 423/119, 121, 122, 127, 423/130, 131, 137, 630, 625

[56] References Cited

U.S. PATENT DOCUMENTS

| 312,894 | 2/1885 | Petraeus | 423/131 |
| 1,821,138 | 9/1931 | Bradley et al. | 423/127 |
| 2,280,998 | 4/1942 | Brown | 423/121 |
| 2,527,257 | 10/1950 | Judd | 423/121 |
| 3,085,853 | 4/1963 | Lesinski et al. | 423/131 |
| 3,127,239 | 3/1964 | Cook | 423/122 |
| 3,198,622 | 8/1965 | Herzog et al. | 423/127 |
| 3,445,187 | 5/1969 | Sibert | 423/625 X |
| 3,737,514 | 6/1973 | King | 423/121 |

FOREIGN PATENT DOCUMENTS

| 472,426 | 3/1951 | Canada | 423/121 |
| 1,271,097 | 6/1968 | Germany | 423/122 |
| 601,968 | 5/1948 | United Kingdom | 423/131 |
| 20,970 | 9/1913 | United Kingdom | 423/265 |
| 592,324 | 9/1947 | United Kingdom | 423/113 |

OTHER PUBLICATIONS

West et al., Text Book of Biochemistry, fourth edition, 1966, The MacMillan Co., N.Y., N.Y., pp. 204–205, 226–229, 244–249, 1373.

*Primary Examiner*—O. R. Vertiz
*Assistant Examiner*—Gary P. Straub
*Attorney, Agent, or Firm*—Pennie & Edmonds

[57] ABSTRACT

The settling rate of caustic alkali-digested goethite-containing bauxite or laterite, or the like, is increased by carrying out the digestion in the presence of a reducing agent capable of reducing the trivalent iron component of the goethite to a lower valence so as to convert the goethite to hematite, magnetite, metallic iron, or combinations thereof, which enhance the settling rate of the digestion mass.

1 Claim, No Drawings

METHOD OF DIGESTING BAUXITE VIA THE BAYER PROCESS WITH THE ADDITION OF REDUCING AGENTS

This invention relates to the separation of valuable substances from natural minerals and ores by digestion with caustic alkaline solutions at elevated temperatures and more particularly to the process for the extraction of alumina from bauxite, laterite and related minerals, and to an improved method for converting the goethite and alumo-goethite or hematite contained in these minerals into hematite and magnetite.

In the Bayer process, alumina is extracted from the bauxite or laterite by digestion with caustic soda solution at elevated temperature to dissolve the contained alumina to form sodium aluminate solution, followed by cooling of the clarified solution to precipitate the alumina as crystalline alumina hydrate which is separated from the caustic solution, after which the depleted caustic solution is recycled to the digestion step. The bauxite normally contains caustic-insoluble components notably the oxides of iron, titanium, manganese, and also during the digestion various insoluble silicate minerals are formed, and these are principally in the form of a finely divided mud which is suspended in the digestion product, from which it is usually separated by settling followed by filtration. This settling step produces the so-called "red mud" which is usually a 15 to 20 weight percent suspension of fine solids in sodium aluminate liquor. This liquor is recovered from the red mud by counter-current washing with hot water, in a series of stages of mixing and settling. The settling and washing of red mud represents a substantial fraction of the capital and operating costs of the Bayer process.

In order to hasten the settling of red mud, it is usual to add a colloidal solution of starch to the cooled digester effluent prior to settling. This starch causes the flocculation of the suspended mud particles and increases the settling rate. Typical usage of starch is one percent of the weight of the mud solids, and virtually all of this starch is rejected from the process as part of the mud.

Due to its finely divided state, even after flocculation, the red mud settles very slowly, and much time and holding capacity has to be provided at each stage of settling and washing. The cost of providing and operating the equipment for settling and washing is roughly proportional to the required settling time. Furthermore, the concentrations of solids which is achievable in the settled mud is variable and is sensitive to composition of the mud and its content of certain minerals, notably goethite. The cost of washing the mud to recover its associated soluble caustic soda and sodium aluminate is roughly proportional to the amount of caustic liquor associated with a given weight of mud solids, and so also is the quantity of caustic liquor which is ultimately rejected with the washed red mud.

For the above reasons there are distinct economic advantages in the conversion of the insoluble components of the red mud into mineral species and forms which settle quickly and which form a consolidated mud having a high content of solids.

Bauxites from many of the commercially important deposits contain an appreciable fraction of the iron oxide in the form of goethite, FeOOH, or alumo-goethite (Fe,Al)OOH in which as much as 30% of the iron is replaced by aluminum. Experience has shown that the alumina content of this alumogoethite cannot be extracted unless the goethite is transformed into hematite or magnetite.* Furthermore, experience has shown that substantial amounts of goethite in the red mud from a digested bauxite greatly hinder the settling and consolidation of the mud, to the extent that some deposits of otherwise valuable bauxite cannot be economically processed by reason of excessive goethite in the mud, and resulting poor settling characteristics.

*Ref: K.Solymar, "Recent Results in the Chemistry and Modelling of the Bayer Process," Proc. Second International Symposium of IC-SOBA, 3, 45-65 (1971).

It is therefore commercially desirable to convert the goethite or alumo-goethite into hematite or magnetite, in order to extract its alumina content, and in order to produce a mud which has acceptable properties of settling and consolidation.

When heated in air, goethite FeOOH may be converted into hematite $Fe_2O_3$ by simple dehydration at temperatures as low as 70° C. However, under the strongly hydrating conditions of the Bayer process, as practised for the extraction of mono-hydrate alumina, at high pressure and temperatures of 200°-240° C., this dehydration reaction does not readily occur at temperatures below 240°-250° C. and may be inhibited entirely by other conditions of the digestion reaction.

Research by others leads to the conclusion that under the conditions of monohydrate alumina digestion, at high temperature and in the presence of strong alkali, the transformation of goethite into hematite requires the intermediate step of solution of trivalent iron to form sodium ferrate or other soluble complexes, followed by deposition of hematite on existing hematite crystals. This research leads to the further conclusion that the transformation does not proceed unless the reaction mixture is suitably seeded with hematite to nucleate its further precipitation. Bauxites with low contents of hematite normally exhibit poor settling properties.

In order to secure the conversion of goethite in bauxites deficient in hematite it is desirable to create the conditions which favor the modification of the crystal surface of goethite so that the necessary nucleation of the reaction is provided thereby, and will proceed in the absence of hematite in the original bauxite. The object of this invention is to create a reaction environment which favors the transformation of goethite to hematite or magnetite, in the absence of these latter minerals in the original bauxite or laterite.

This invention consists of adding to the reaction mixture of bauxite and caustic aluminate liquor a suitable reducing agent having the capability of reducing some of the iron in the goethite to the bivalent state, or possibly to metallic iron, under the digestion conditions generally used for bauxite requiring digestion temperatures in excess of 400° F., that is, conditions applicable to the digestion of boehmetic or diasporic bauxite at temperatures of about 400° to about 500° F. or higher, under superatmospheric pressure, for at least 20 minutes. The effect of this bivalent iron is to convert some of the original goethite into a mixture of hematite and magnetite, the actual proportion depending on the degree of reduction. This reaction appears to alter the surface of the crystals of geothite or alumo-goethite thereby enhancing the transformation of goethite to hematite, and also altering the hydrophilic surface properties resulting in a red mud having greatly improved settling properties. The red mud resulting from the practice of this invention is actually dark gray or black, apparently due to the presence of magnetite.

In the preferred embodiment of this invention the reducing substance is a carbohydrate such as sucrose, starch or cellulose, a metal such as iron or aluminum powder or scrap aluminum foil, a chemical reductant such as stannous chloride or hydrazine, or black liquor or red liquor from wood pulp manufacture, molasses, bagasse, chaff, straw, wood, leaves, seaweed, and the like. It is believed that under the digestion conditions the saccharide may react with caustic soda solution to form salts of polyhydric dibasic acids such as tartaric acid which have the property of sequestering iron and other heavy metals, and thereby increasing the rate of solution and deposition of iron oxide as hematite and magnetite. However, any suitable reducing agent may be employed in the practice of the invention.

It is known that the sodium oxalate which normally accumulates in the caustic liquor of the Bayer process, as a result of reaction between caustic soda and the naturally occuring organic substances contained in the bauxite, is not effective as a reducing agent in the practice of this invention.

As an example of the practice of this invention for the improvement of the settling rates of red mud, comparative digestion experiments were carried out, using a certain variety of Jamaican bauxite "Betese" which is deficient in hematite and normally produces a light brown mud which is difficult to settle. Suitable quantities of this bauxite were batch-digested, with and without added lime, at 470° F. for 30 minutes in a stirred pressure reactor, using normal Bayer-plant liquor containing about 130 grams per liter of caustic Na$_2$O, and containing substantial amounts of sodium oxalate. After digestion the resulting slurry of aluminate liquor and "red" mud was flash-cooled to 210° F. and after the addition of starch suspension equal to one weight-percent of the mud, the slurry was allowed to settle in heated 1000 ml. graduates and the settling rate was measured. Some of the tests were blank while in others sucrose was added to the digestion mixture equal to 0.95% of the weight of dry bauxite. Settling rates of the resulting red muds were as follows:

| | Settling Rate of Mud, feet/hour | |
|---|---|---|
| | Sugar added | No sugar |
| Betese bauxite, plus lime | 10.1 | 8.3 |
| Betese bauxite, no lime | 11.0 | 6.9 |

The mud from the tests using sugar was appreciably darker in color than the mud from the control tests, probably due to the presence of magnetite.

As an example of the practice of this invention for increasing the transformation of goethite into hematite and magnetite, comparative batch digestions experiments were made using Jamaican "Betese" bauxite and Bayer plant liquor containing about 130 grams of caustic Na$_2$O per liter, at 40 minutes retention time and temperatures of 460°, 470° and 480° F. Lime equal to 5 percent of the dry bauxite was added to each. One set of experiments was made without sugar, as a control, and other sets of experiments were made using sugar (sucrose) as reducing agent which was added to the digestion mixture, in the amounts of 3 and 6 grams per liter of liquor. After reaction the resulting slurries were cooled and filtered, and the mud residues were washed and dried. The resulting dry mud was analyzed by X-ray diffraction to determine the approximate content of goethite, hematite and magnetite. The results are as follows:

| 40 Minutes reaction | No Sugar | | | 3.0 gpl Sugar | | | 6.0 gpl Sugar | | |
|---|---|---|---|---|---|---|---|---|---|
| | G* | H* | M* | G | H | M | G | H | M |
| Temperature 460° F. | 100% | — | — | 50% | 40% | 10% | 10% | 50% | 40% |
| Temperature 470° F. | 90 | —10 | — | 40 | 35 | 25 | 0 | 50 | 50 |
| Temperature 480° F. | 60 | —40 | — | 30 | 50 | 20 | 20 | 40 | 40 |

*G—Goethite, H—Hematite, M—Magnetite

The muds which resulted from the experiments in which sugar was added to the digestion mixture were darker in color and exhibited more pronounced magnetic properties than the muds which resulted from the control experiments without sugar. These experimental results indicate that the use of a reducing agent, sucrose, substantially increased the transformation of goethite into hematite and magnetite.

As an example of the use of cellulose in the practice of this invention, a mixture was prepared comprising Jamaican bauxite and Bayer process caustic soda liquor in such proportion as to produce a sodium aluminate solution containing equal parts by weight of dissolved caustic sodium oxide, Na$_2$O, and dissolved alumina Al$_2$O$_3$, after digestion. Cellulose in the form of bagasse was added to the mixture in an amount equal to 2 percent of the dry bauxite. The mixture was digested for 30 minutes at 485° F and then cooled to 210° F, and discharged into 1000 ml glass graduated cylinders, starch suspension was added and the mixture was allowed to settle. The "red mud" which was completely black, quickly formed a dense deposit at the bottom of the cylinder. Most of the supernatant liquid phase was then decanted. The open end of the cylinder was closed and the cylinder was held in the horizontal position and the residue was redispersed by causing the liquid to flow along the cylinder. A horseshoe magnet was held against the outside of the cylinder while the contents were so agitated and the solids were observed to deposit in dense agglomerations on the glass surface in the vicinity of the pole faces of the magnet. Upon standing a clear liquid phase developed above this agglomerated deposit. As an example of the use of sugar in the practice of this invention on a commercial scale, a slurry of goethitic Jamaican bauxite and Bayer process caustic soda liquor was prepared in such proportion as to produce a sodium aluminate solution after digestion containing 1.1 grams of dissolved alumina per gram of caustic sodium oxide. Sugar was added to the bauxite in the proportion of 0.013 grams of sugar per gram of dry bauxite, and the mixture was pumped to reactors where it was digested for about 40 minutes at 480° F. Before the addition of sugar the digester product contained a brown mud having poor settling qualities, but when the added sugar reached the digesters the resulting digester product turned dark and eventually black, and the contained mud settled very rapidly. This dark mud with good settling properties continued to be produced for several hours after the addition of sugar was terminated.

We claim:

1. In the Bayer process for the separation of alumina from goethite-containing or alumo-goethite-containing bauxite by digestion with aqueous caustic soda, the improvement whereby the settling rate of the resulting suspended solids in the digested mixture is increased by the chemical conversion of a portion of the goethite to hematite and magnetite, said improvement comprising contacting the bauxite during the digestion at a temperature of between about 400° and 500° F. under superatmospheric pressure for a period of time of between about 20 and 40 minutes with a reducing agent capable of reducing at least a part of the trivalent iron in the goethite or alumogoethite to the divalent state under the digestion conditions and selected from the group consisting of sucrose and cellulose, said reducing agent being added to the digestion mixture in an amount of between about 1 and 2 percent by weight based on the weight of dry bauxite.

* * * * *